United States Patent [19]

Korsch et al.

[11] Patent Number: 5,088,915

[45] Date of Patent: Feb. 18, 1992

[54] COATED-CORE PRESS

[75] Inventors: Wolfgang Korsch; Michael Schmett, both of Berlin, Fed. Rep. of Germany

[73] Assignee: Korsch oHG Maschinenfabrik, Berlin, Fed. Rep. of Germany

[21] Appl. No.: 466,260

[22] PCT Filed: Jun. 7, 1987

[86] PCT No.: PCT/DE89/00375

§ 371 Date: Mar. 9, 1990

§ 102(e) Date: Mar. 9, 1990

[87] PCT Pub. No.: WO89/11968

PCT Pub. Date: Dec. 14, 1989

[30] Foreign Application Priority Data

Jun. 8, 1988 [DE] Fed. Rep. of Germany ....... 3819821

[51] Int. Cl.⁵ ................... B29C 43/20; B30B 11/08
[52] U.S. Cl. .................. 425/345; 264/109; 264/112; 264/571; 425/353
[58] Field of Search ............... 264/109, 112, 113, 510, 264/511, 571; 425/345, 348 R, 353

[56] References Cited

U.S. PATENT DOCUMENTS 2,946,298  7/1960  Doepel et al. .................. 264/275
2,963,993 12/1960  Stott ............................... 425/345
3,960,292  6/1976  Knapp ............................. 221/211

FOREIGN PATENT DOCUMENTS

858538  1/1961  United Kingdom .

Primary Examiner—Mary Lynn Theisen
Attorney, Agent, or Firm—McGlew & Tuttle

[57] ABSTRACT

The invention concerns a coated-core press for making coated tablets. In prior art coated-core presses, the problem arises of centering the cores exactly in the powder undercoating in the matrix, particularly when the matrix table is rotating at high speed. In order to solve this problem, a device for picking up and transferring the cores (9) is arranged on the lower side of the vertically adjustable core die (31) and comprises gripping devices which pick up the cores in the pick-up station (60) and press them into the center of the underlayer of powder material formed inside the corresponding matrix (3).

22 Claims, 12 Drawing Sheets

COATED-CORE PRESS

BACKGROUND OF THE INVENTION

Field of the Invention

The invention relates, in general, to press-forming objects and, in particular, to a new and useful coated-core press for producing coated tablets and to a method and apparatus for transferring cores into a bottom layer of powder material.

A coated-core press is known from U.K. patent No. 858,538. It has considerable disadvantages with respect to the transfer action of the cores from a core storing tube over an annular disc into one of the dies of the die tables. The cores fall out from the core storing tube on the annular discs of the transfer mechanism and are received by fork-type receiving elements transferring the cores into receiving apertures of the transfer heads. Therein are guided punches having short extensions, such punches are supported by means of upper annular cams so as to be raised or lowered in the transfer heads. The punches press with their lower extensions of the cores being guided on the annular disc by means of the transfer mechanism, until the transfer heads are brought into register with the dies of the die table. The cores will then fall under the action of the punches into the dies. Prior to that, the lower punch guided in the die is lowered, and the die is filled up with the bottom layer of powder material serving for coating. Then, the lower punch is further lowered by a small amount. Only then is the core placed onto the bottom layer present in the die, the lower punch being, then, further lowered and the die being filled up with the top layer of powder material. Finally, coating of the core is finished between lower and upper punches by means of the upper punch entering into the die.

For accurate positioning of the core in the bottom layer of powder material, there is available a very short period of time only with the known coated-core press, namely the limited period of time during which the transfer head of the transfer mechanism and the associated die are guided accurately concentrically with respect to each other. This period of time may, in case of low quantities of approximately 20,000 tablets per hour, i.e. low rotational speed of transfer mechanism and die table, be just sufficient to bring the core under the action of its own weight centrally into the bottom layer of powder material inside the die. For higher quantities of up to 100,000 per hour and, thus higher rotational speeds of transfer mechanism and die table, this short period of time of register of the partial circles of die and transfer head will, however, not be long enough to bring the core safely centrally into the bottom layer of powder material inside the die.

Furthermore, the centrifugal force acting on the core, such force increasing by a square law with respect to the rotational speed, causes another disadvantage in that the core, possibly just brought centrally into the die, will slip outwardly on the bottom layer of powder material, so that exact centering of the core inside the coated-core tablet is not possible.

For the known coated-core press, it is, thus, disadvantageous both because the cores are subjected to friction on the annular disc which is a stationary component comprising segment-type cuts to receive two die tables, and also because the cores fall substantially under the action of their own weight from the transfer heads into the dies, thus a relatively slow speed of the coated-core press is effected.

Accordingly, it is an object of the invention to provide an improved device for positioning a core material inside of the powdered material in the formation of a table and which includes a transferring mechanism for holding the core and which transfer mechanism has a core punch with a vacuum system or other gripping means for engaging a core and positioning it in a dye which contains the powdered material.

A further object of the invention is to provide a method of positioning a core in a powdered material in the formation of a tablet which comprises employing a punch having a gripping mechanism for engaging the core material and transferring it into a die containing the powdered material and for moving the punch to accurately position in the core in respect to the powdered material during the formation of the tablet.

A further object of the invention is to provide a device for positioning the core in a tablet in which the core is surrounded by a powdered material which is simple in design, rugged in construction and economical to manufacture.

SUMMARY OF THE INVENTION

The invention provides a coated core press and a method for producing coated core tablets having an accurate centering and positioning of the cores in the die which are filled up with a bottom layer of powder material.

According to the invention, the mechanism for receiving and transferring the cores include gripping devices at the bottom side of raisable and lowerable core punches. The gripping devices pick up the cores in the receiving station and press them into the transfer section centrally into the bottom layer of powder material formed inside the associated die. For this purpose, the lower sides of the core punches themselves engage into the dies so as to effect accurate centering of the cores within the bottom layer of powder material in the die. Centering is effected by pressing the core into the powder material by means of vertically raisable and lowerable transfer heads which are provided with gripping devices. Thereby, a displacement of the core as it is integrated in the die, e.g. by the action of centrifugal force, occurring with high rotational speeds of the die table, is prevented.

By the coated core-press according to the invention, the cores can be pressed in within the tablet to be produced with an accuracy of ±0.1 mm, so that the wall thickness of the coating layer surrounding the core can be built up in a uniform manner. For the accurate performance of the coated-core press partial circles of the die table and the transfer mechanism are made substantially of equal size so that the rotational speeds on partial circles will be identical.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENTS

The coated-core press in the first embodiment shown in the drawings 1 to 4 and serving to produce coated tablets 143 (FIG. 12) comprises a rotatably driven die table 1 with dies 3 arranged on a partial circle 2. A transfer mechanism 4 is rotatably driven about an axis 6 parallel to an axis 5 of the die table 1, and a receiving mechanism 60 for feeding cores 9 to the transfer heads 8 supported at the free ends of radial arms 7 disposed in the transfer mechanism 4.

Figure 4:
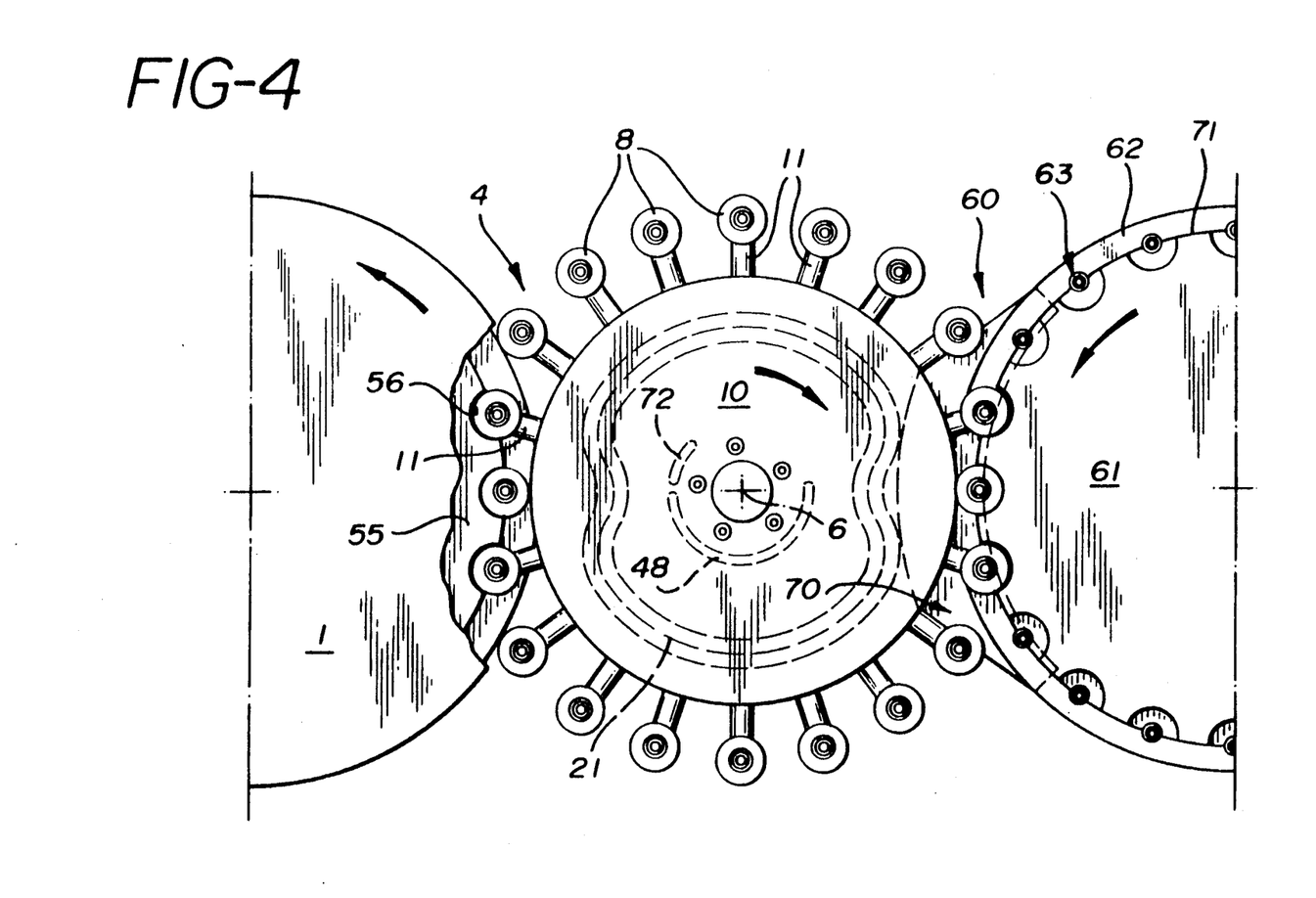
FIG. 4 is a schematic representation of a top view of the coated-core press.
Figure 5:
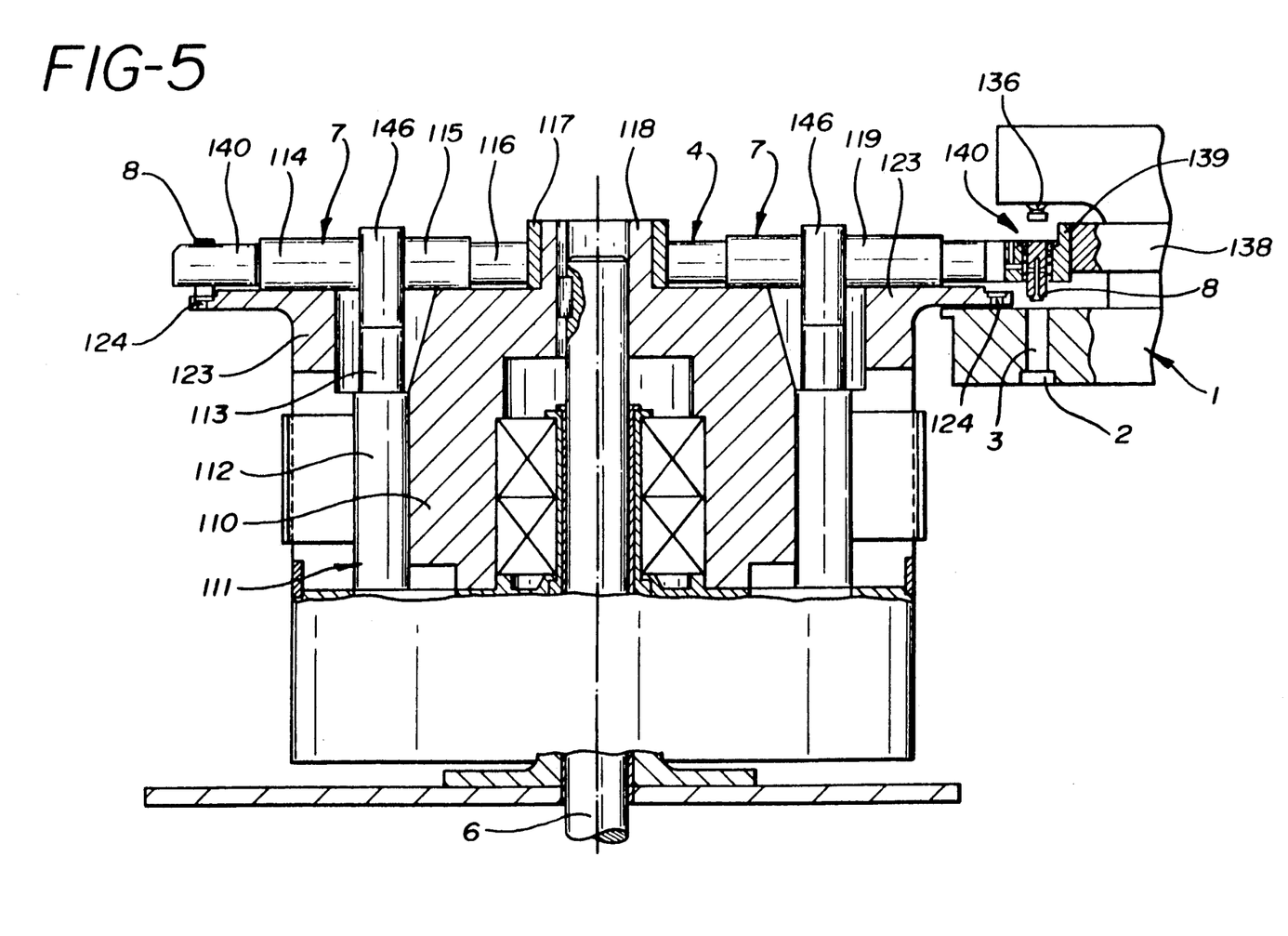
FIG. 5 is a vertical section through a coated-core press in the second embodiment.
Figure 6:
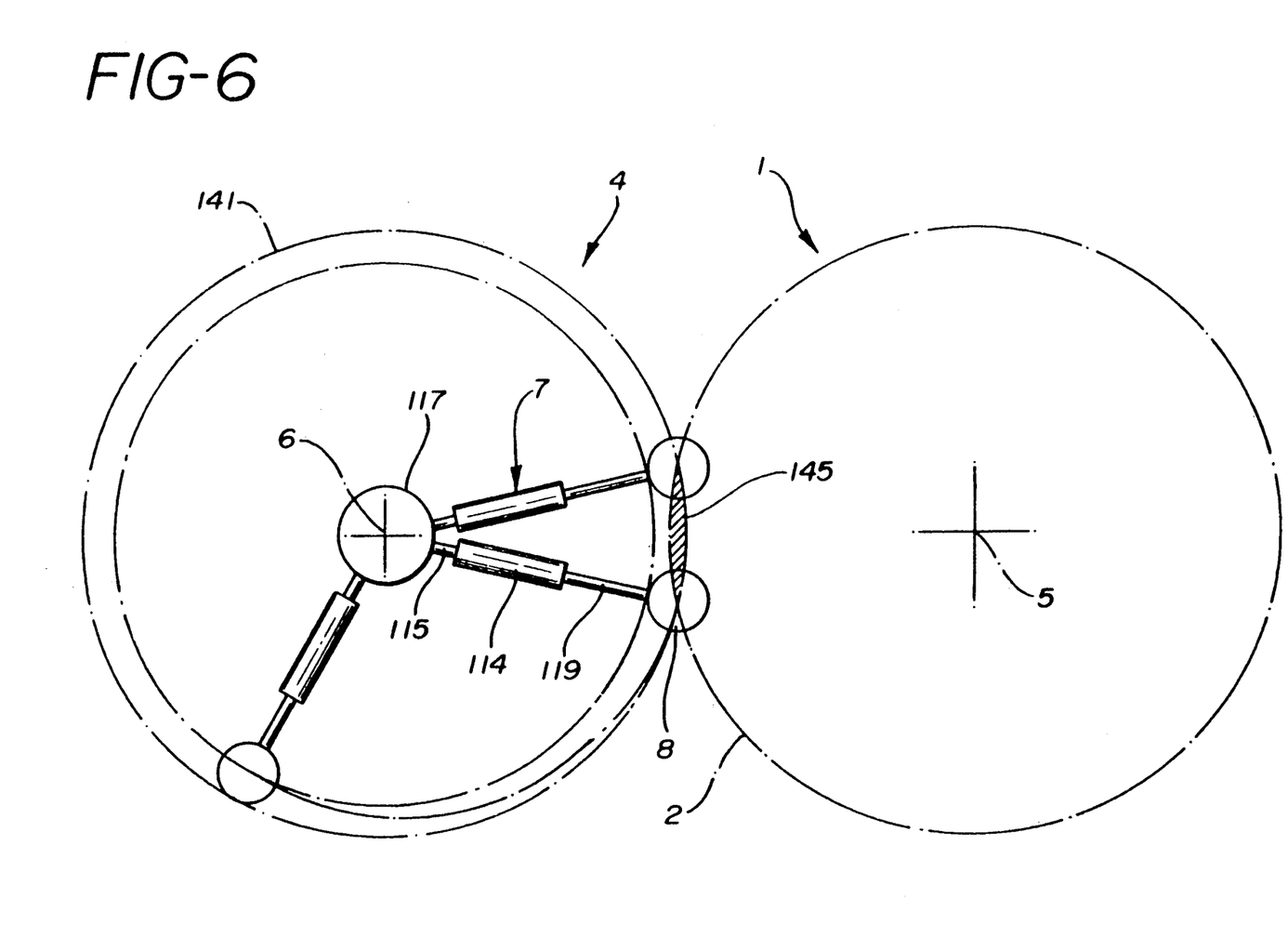
FIG. 6 is a schematic representation of a top view of the coated-core press according to FIG. 5.
Figure 7:
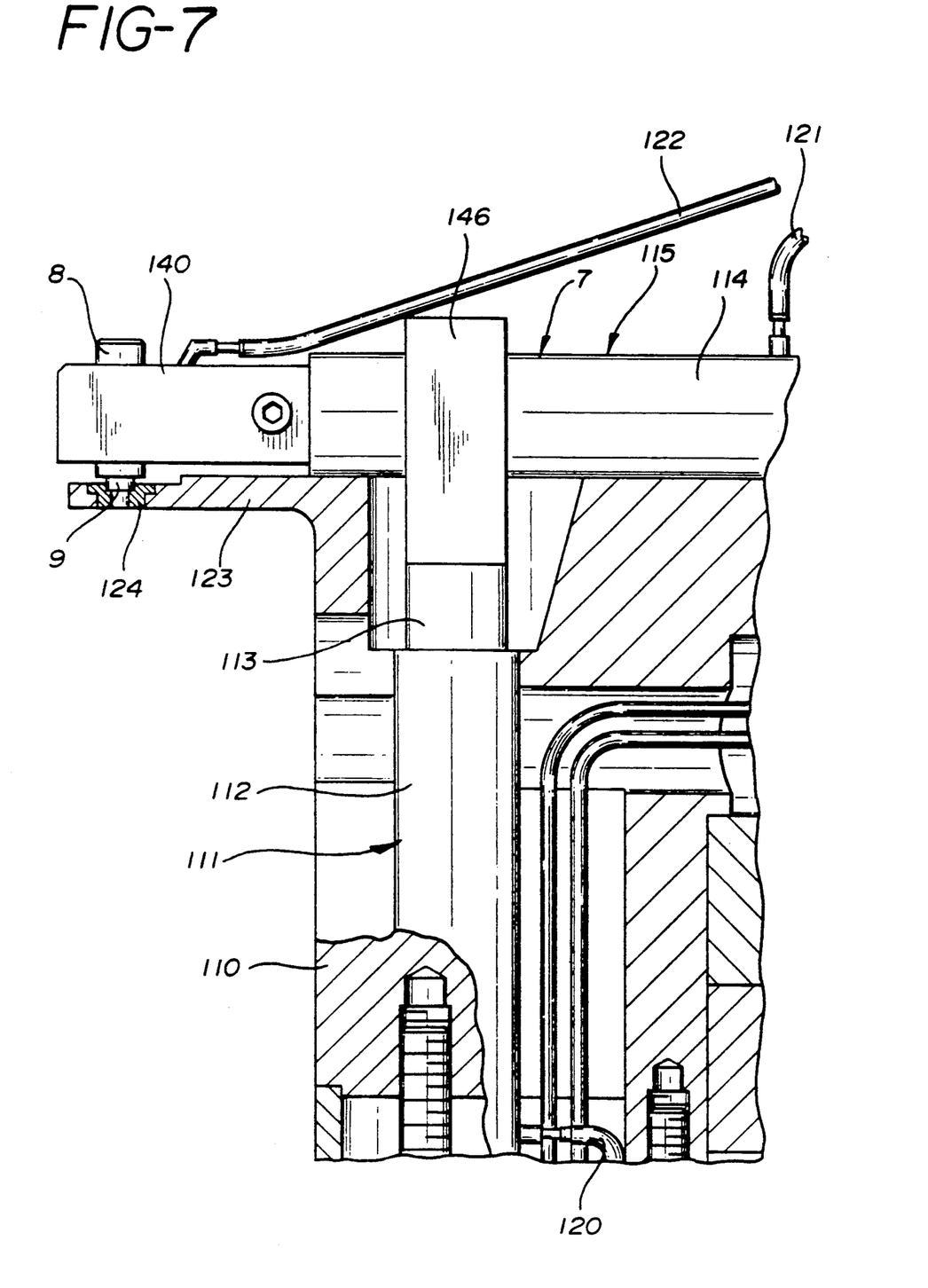
FIG. 7 is an enlarged partial section through the transfer mechanism of the second embodiment of the coated-core press when receiving a core.

The transfer mechanism 4 includes a rotor 10 rotatable about an axis 6. At the periphery of a rotor 10, a plurality of horizontal guide pistons 11 are supported to move radially, such guide pistons being part of the radial arms 7. In the shown embodiment, 20 guide pistons 11 are provided, each having one transfer head, as shown in FIG. 4 in a top view. For each guide piston 11 is provided within the rotor 10 a radial bore hole 12 into which is inserted near to the axis 6 and at the outer periphery one slide-bearing bushing 13, 14 each serving to guide one guide piston 11 each of circular cross section. Between the two slide-bearing bushes 13, 14, the rotor 10 is provided at the bottom with a surrounding groove 15, the top of which is provided with a bearing plate 16, against which a guide plate 17 rests, such guide plate being fixed on top of the guide piston 11. By means of the bearing plate 16 and of the guide plate 17, radial guiding of the guide piston 11, safe against being rotated, is effected.

Figure 1:
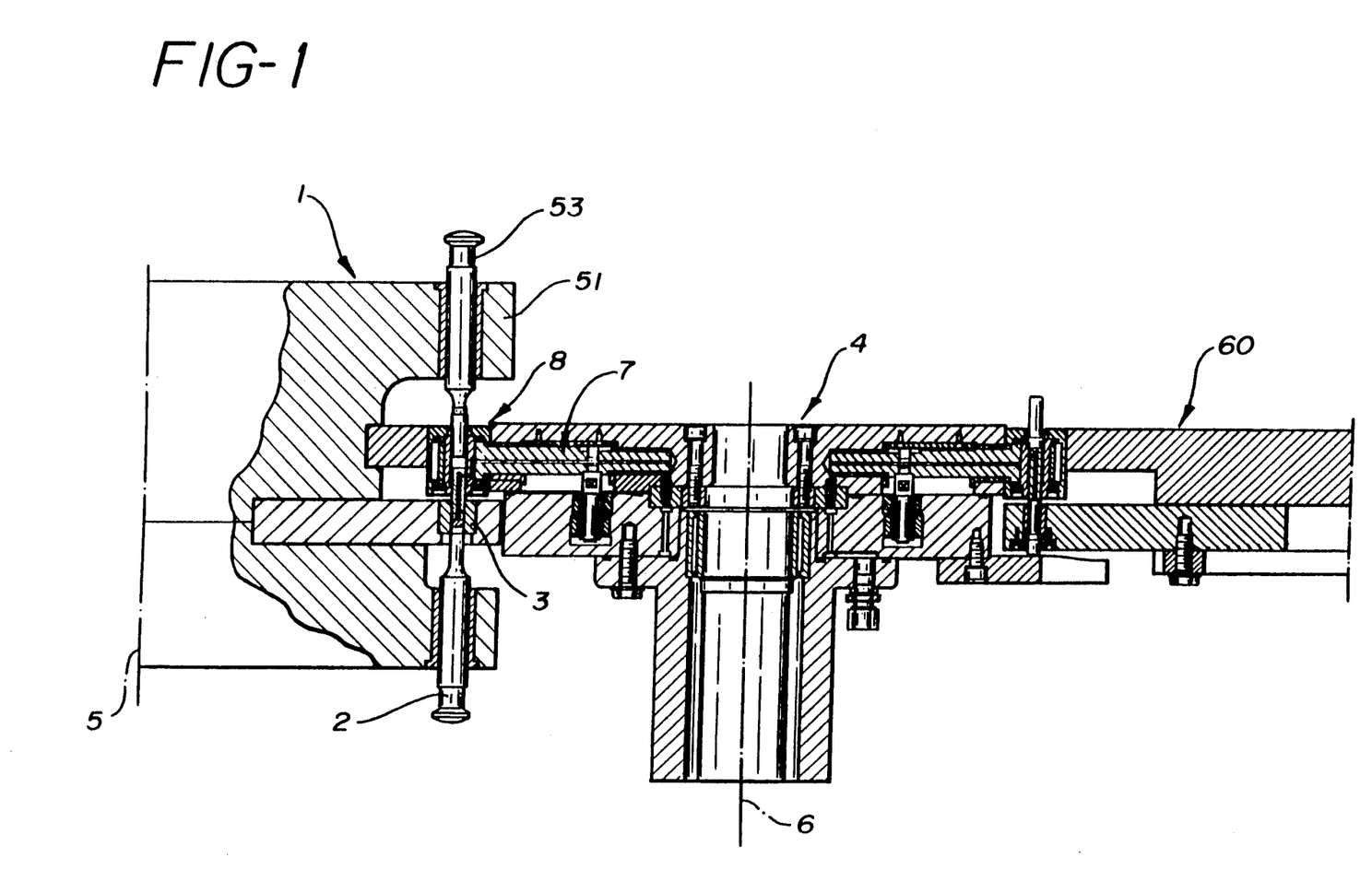
FIG. 1 is a vertical sectional view through a coated core press of a first embodiment of the invention.
Figure 2:
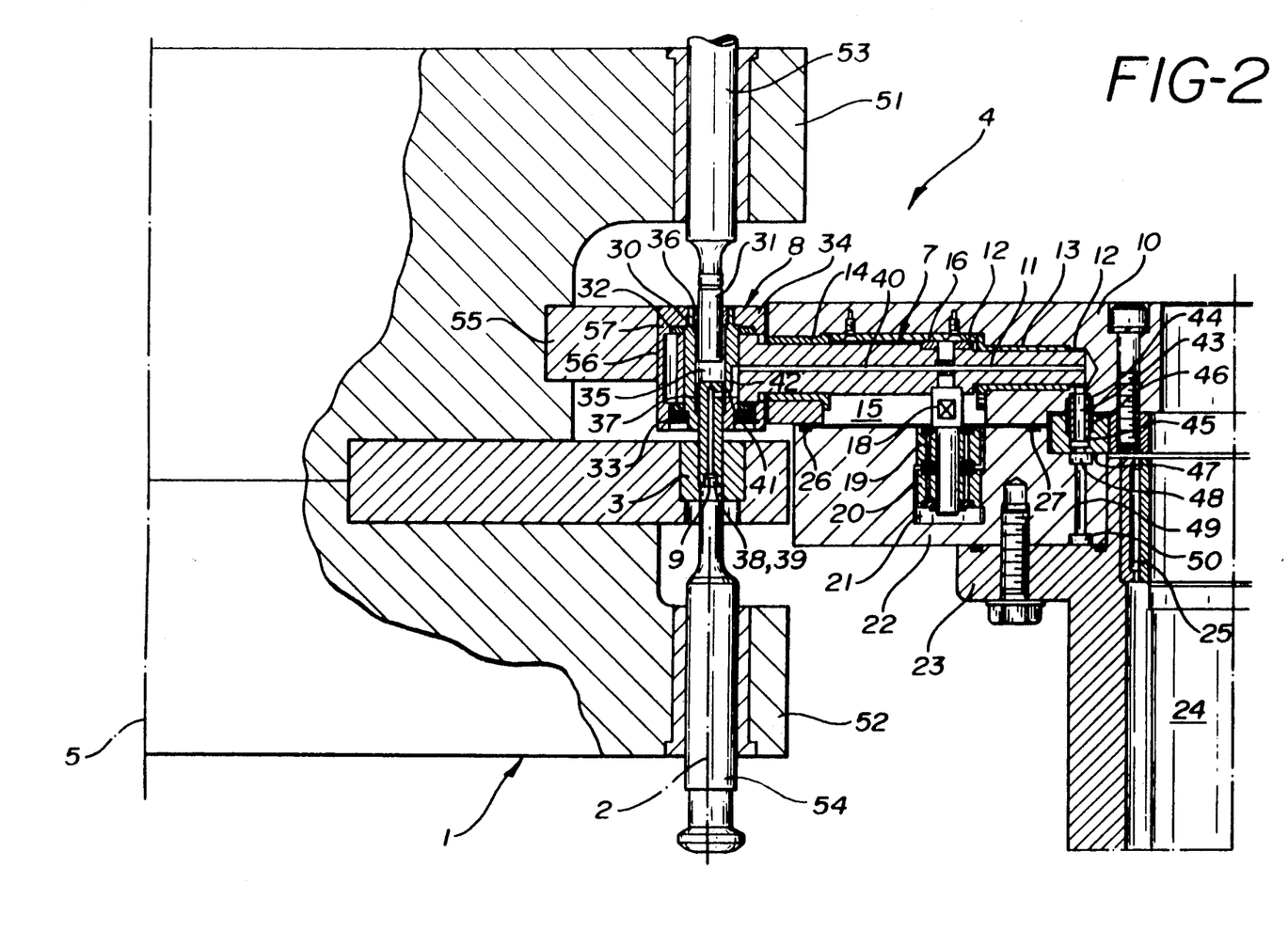
FIG. 2 is an enlarged vertical section through part of the die table and part of the transfer mechanism of the coated core press according to FIG. 1.

In the area of the guide plate 17, the guide piston 11 is penetrated radially by a cam pin 18 resting within the surrounding groove 15 and engaging at its bottom end by means of support rollers 19, 20 into a grooved-cam cure 21 of a grooved-cam curve disc 22 being fixedly connected with a stationary column 23 receiving in turn the drive shaft 24 for the rotor 10 of the transfer mechanism 4 by means of needle bearings 25. The two support rollers 19, 20 engage each at the radially outside or radially inside, respective, sides of the grooved-cam curve 21, as is shown in FIG. 2. The grooved-cam curve 21 extends—as is shown in FIG. 4—over its essential length concentrically with the axis 6 of the transfer mechanism 4. Solely in the receiving and transfer areas of the cores 9, the grooved-cam curve approaches the axis 6, as will be explained hereafter.

The rotor 10 of the transfer mechanism 4 rests in axial direction on two slide rails 26, 27 being received in the top side of the grooved-cam curve disc 22.

At the free outer ends of the guide pistons 11 are arranged the transfer heads 8. These comprise a guide bush 30 inserted into a borehole parallel to the axis 6 of the guide piston 11, a core punch 31 guided in the guide bush 30, two guide discs 32, 33 surrounding the guide bush 30 on the outside, and an outer guide sleeve 34. The core punch 31 comprises approximately in its central longitudinal plane a surrounding collar 35 sliding in the guide bush 30, whereas the upper punch section of the core punch 31 is guided by means of a guide ring 36. On the bottom side of the surrounding collar 35 rests a compression spring 37 pushing the unloaded core punch 31 upwards. The other end of the compression spring 37 rests on the bottom of a gap space formed within the guide bush 30.

Through the lower punch section of the core punch 31 extends axially a blind borehole 38 terminating at the lower end of the core punch 31 and forming a vacuum tube 39 for sucking cores 9 to the lower side of the core punch 31. Through the guide piston 11 extends further a borehole 30 being connected over axial and radial connecting boreholes 41, 42 with the blind borehole 38 forming the vacuum tube 39 in the core punch 31. The borehole 40 passes also through the cam pin 18, as is shown in FIG. 2. The borehole 40 terminates at the inner end of the radial bore 132 for the guide piston 11. In this area terminates a borehole 43 extending parallel to the axis 6 and passing through a bush 44 inserted into a vacuum disc 45 and into the rotor 10. A compression spring 46 arranged in a gap surrounding the bush 44 presses the vacuum disc 45 against the surface of a recess 47 within the grooved-cam curve disc 22. Within the recess 47 is formed a groove-type vacuum chamber 48 extending over part of the periphery of the grooved-cam curve disc 22, as is shown in FIG. 4 and as will be explained hereafter. From the groove-type vacuum chamber 48 extends a borehole 49 to a vacuum-supply line 50. All boreholes and components provided with the reference numerals 38 to 50 form, in an assembled condition, an under pressure mechanism 29 for the controlled supply of vacuum serving to grip a core 9 at the free end of the vacuum tube 39 of the core punch 31.

When die table 1 provided with a plurality of dies 3 comprises an upper and a lower guide disc 51 and 52 and the upper punches 53 or lower punches 54, respectively, are guided concentrically with the axes of the dies 3. The punches are controlled by cams (not shown) and they press powder material 144 filled into the dies 3 for coating the cores 9 and for forming coated-core tables 143. In addition, the upper punches 53 of the first embodiment of the coated-core press serve to load the core punch 31 when inserting a core 9 into a die 3 and to press a core 9 against the action of the compression spring 37 into the bottom powder layer formed within the die 3 on the lower punch 54.

Between the upper guide disc 51 and the die table 1 is disposed a head-guiding rim 55 being stationarily connected with the die table provided on the partial circle 2 of the die table 1 with semi-circular head-receiving depressions 56. Correspondingly circularly shaped head sections 57 of the transfer heads 8 of the guide pistons 11 engage in rotating and sliding manner with the dies. It is provided, herefor, that the partial circle on which the axes of the transfer heads 8 of the radial arms 7 or of the guide pistons 11, respectively, move in radially extended position, 15 and the radial circle 2 of the dies 3 of the die table 1 overlap by at least the distance between two dies 3, as is shown in more detail in FIG. 4. Herefor, the transfer heads 8 are guided in the overlap area of the partial circles on the partial circle 2 of the die table 1, as will be explained hereafter.

The receiving mechanism 60 diametrically opposed to the die table 1 over the transfer mechanism 4 comprises a head-guiding rim 61 provided analogously to the head-guiding rim 55 of the die table 1 with semi-circular head-receiving depressions 56 into which engage the head-shaped guide sleeves 57 of the transfer heads 8 in rotating and sliding manner. The guide disc 61 is rigidly connected with a receiving disc 62 for the cores 9, such receiving disc comprising 20 receiving pockets 63 for the cores 9. Such receiving pockets 60 are composed of an outer guide bush 64 fixedly screwed into an axial borehole of the receiving disc 62, of a hollow outer punch 65 guided in the guide bush 64, and of an inner punch 66 in turn guided in the outer punch 65. Between the outer guide bush 64 and the outer punch 65 are arranged an inner and an outer compression spring 67, 58 loading the inner punch 66 or the outer punch 65, resp. The lower section of the inner punch 66 is guided in a guide plate 69 being screwed together with the guide bush 64 to the receiving disc 62.

On the bottom side of the grooved-cam curve disc 22, in the area of the receiving mechanism for the cores 9, is screwed-on a raise cam curve 70 on which are guided the inner punches 66 for receiving a core 9 in a transfer head 8.

The mode of operation of the coated-core press in the embodiment described heretofore is as follows:

On the upper side of the receiving disc 62, cores 9 are placed in a manner not shown in more detail, said cores being distributed over the individual receiving pockets 63. The outer and inner punches 65, 66 are under the action of the springs 67, 68 underneath the surface of the receiving disc 62. When the inner punch 66 runs on the raise cam curve 70, first the inner punch 66 is slightly raised, so that the core placed thereon will be raised slightly above the upper edge of the outer punch 66. Only then is—delayed by the intermediate inner spring 68 - the outer punch 65 raised, too.

Figure 3:
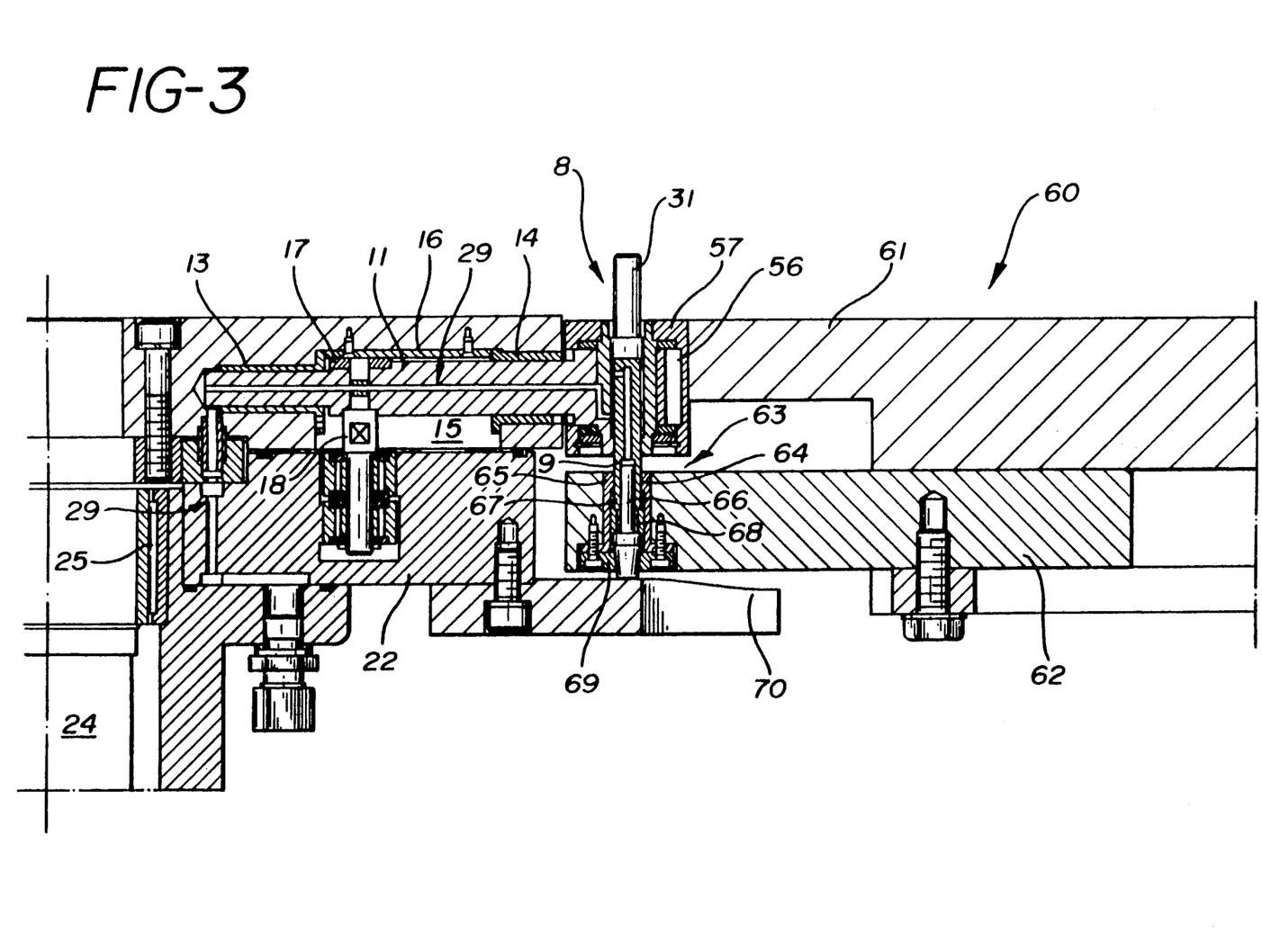
FIG. 3 is an enlarged representation of part of the transfer mechanism and of a receiving mechanism of the coated core press according to FIG. 1.

Now, the respective transfer head 8 will, under the action of the cam pin 18 engaging with its support rollers 19, 20 into the grooved-cam curve 21 and of the respective guide piston 11, come into a path exactly in register with the partial circle 71 of the receiving pockets 63, so that over a certain range of rotation of the receiving discs 62, a core punch 31 is brought into register with the outer and inner punches 65, 66, as is shown in FIG. 3. Under the action of the underpressure mechanism 29, the core is seized by the lower side of the core punch 11 under the action of the vacuum built up within the vacuum tube 39, and is passed on during the lowering action of the outer and inner punches 65, 66 in direction of rotation of the transfer mechanism 4.

Transfer of the core 9 from the transfer head 8 to the respective die 3 of the die table 1 is effected, then, by that, after a rotation of the rotor 10 of the transfer mechanism 4 by approximately 180°, the transfer head 8 under control by the cam pin 18 guided in the grooved-cam curve 21 is brought into a curve path being identical to the partial circle 2 of the dies 3 of the die table 1. As soon as the core punch 31 of the transfer head 8 with the core 9 held under vacuum at the lower side of the core punch 31 is pressed under the action of the upper punch 53 into the die 3, the core 9 being pressed exactly centrally into the powder layer existing in the die 3. The vacuum is then suddenly released over the aeration chamber 72, whereupon the core punch 31 releases the core 9.

After release by the upper punch 53, the core punch 31 can, then, after the action of the compression spring 37 be lead off the die 3, whereupon the respective guide pin 11 can be moved out by means of the associated cam pin 18 and of the grooved-cam curve 21.

Control of the guide pistons 11 and of the transfer heads 8 attached thereto with core punches 31 is effected substantially by the grooved-cam curve 21 and the cam pins 18 engaging thereinto. Only for exact register of the core punch 31, on one hand, with the outer/inner punches 65,66 of the receiving mechanism 60 and, on the other hand, with the dies 3 of the die table 1, the transfer heads 8 come into their guide sleeve 57 into engagement with the head-guiding rims 55 of the die table 1 or 61, respectively, of the receiving mechanism 60.

The coated-core press in the second embodiment shown in FIGS. 5 to 11 comprises in corresponding manner a rotatably driven die table 1 with dies 3 arranged on the partial circle 2 and a transfer mechanism 4 being rotatably driven about an axis 6 parallel to the axis 5 of the die table 1 and being provided with radial arms 7, in the head section 140 of which are supported radially movable transfer heads 8, which can be brought into register with the dies 3 for transfer of the cores 9.

Figure 10:
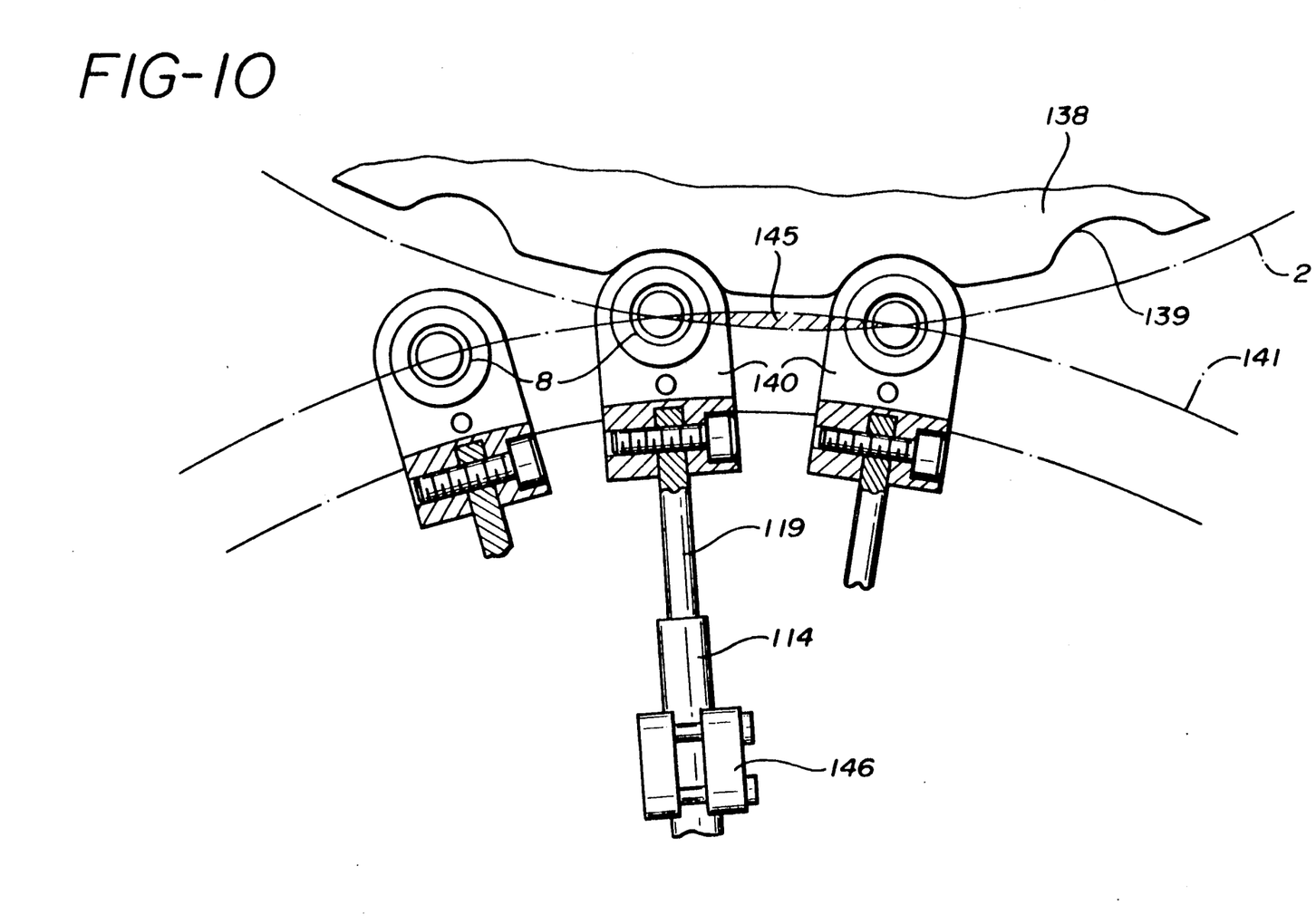
FIG. 10 is an enlarged detail in the area of the overlapping partial circles of the die table and transfer mechanism of the coated-core press of the second embodiment.

The transfer mechanism 4 includes a rotor 110 rotatable about the axis 6, at the periphery of such rotor a plurality of vertical cylinder piston units 111 being arranged, the cylinders 112 thereof being fixedly screwed to the rotor 110. The piston rods 113 of such vertical cylinder piston units 111 bear at their free ends over clamping pieces 146 screwed thereto the cylinders 114, held in clamping manner of horizontal cylinder piston units 115, the cylinders 114 resting over spacer pieces 116 against a centering piece 117 in sliding manner, such centering piece being supported concentrically with the axis 6 of the transfer mechanism 4 at an axial projection 118 of the rotor 110. The centering piece 117 is preferably of bronze. At the free ends of the piston rods 119 of the horizontal cylinder piston 115 are screwed on the head sections 140 with the inserted transfer heads 8. The free ends of the screwed-on head sections 140 are, further, rounded semi-circularly, as is shown in FIG. 10, the centres of the circles being arranged accurately in the axes of the transfer heads 8.

The cylinders 112 of the vertical cylinder piston units 111 are supplied over lines 120, and the cylinders 114 of the horizontal cylinder piston units 115 over lines 115 with pressurized air. The lines 120, 121 are connected to control valves in a manner not shown in more detail, such control valves being connected with a control device. This way, the piston rods 113 and 119 can be controlled upwardly and downwardly, independently from each other, and can be moved inwardly.

Further lines 122 lead to the transfer heads 8 and to underpressure mechanisms, which are in turn actuated by the non-shown control device.

The rotor 110 of the transfer mechanism 4 is provided with an annular disc 123 disposed outside the vertical cylinder piston units 111 in the area of movement of the transfer heads 8, such annular disc bearing receiving pockets 124 assigned to the radial arms 7. The receiving pockets 124 are in the area of movement of the transfer heads 8 and serve to receive the cores 9, which are fed by a supply device not shown in more detail on the side opposed to the die table 1 of the transfer mechanism 4.

The transfer heads 8 have a circular cross section and are made of solid metal material and are provided slightly underneath their central lateral axis with a collar 125 directed radially outwards. The transfer heads 8 are inserted into boreholes 126 parallel to the axis 5 of the transfer mechanism 4, the diameter of such boreholes being slightly greater than the diameter of the collar 125. The boreholes are provided at the upper end with circular flanges 127 guiding the transfer heads 8. Between the collar 125 and the flange 127 of each transfer head 8 is inserted a compression spring 128 maintaining each transfer head 8 in its position directed radially outwardly.

Into the lower side of each transfer head 8 is processed a blind borehole 129 extending axially and centrally, such borehole being connected with a lateral borehole 130 terminating in the annular space 131 receiving the compression spring 128. Therefrom extends a radial borehole 132, wherein terminates the underpressure line 122 over a connection port 133. As the slide seat of the transfer head 8 made from round solid material between, on one hand, the material of the head section 140 and, on the other hand, the material of the circular flange 127 is substantially gas-tight, the borehole 129 extending vertically can serve as a vacuum tube to suck the cores 9 to the lower side of the transfer heads 8 under the action of an underpressure built up over the line 122.

The die table 1 provided with a plurality of dies 3 comprises an upper and a lower guide disc 134, 135, in wherein upper punches 136 or lower punches 137, resp., are guided concentrically with the axes of the dies 3, such punches being controlled by not shown cams and pressing powder material 144 filled into the dies 3 for coating the cores 9 and for forming coated-core tablets 143.

Between the upper guide disc 134 and the die table 1 is disposed a head-guiding rim 138 being stationarily connected with the die table and being provided on the partial circle 2 of the die table 1 with semi-circular head-receiving depressions 139 being directed coaxially with the dies 3 and into which the correspondingly semi-circularly shaped head sections 140 of the radial arms 7 engage in rotating and sliding manner. It is provided, herefor, that the partial circle 141 on which the axes of the transfer heads 8 of the radial arms 7 move in radially extended position, and the radial circle 2 of the dies 3 of the die table 1 overlap by at least the distance between the two dies 3, as is shown in more detail in FIG. 10. Herefor, the transfer heads 8 are guided in the overlap area 145 of the partial circles 2, 141 on the partial circle 2 of the die table 1, as will be explained hereafter.

Figure 8:
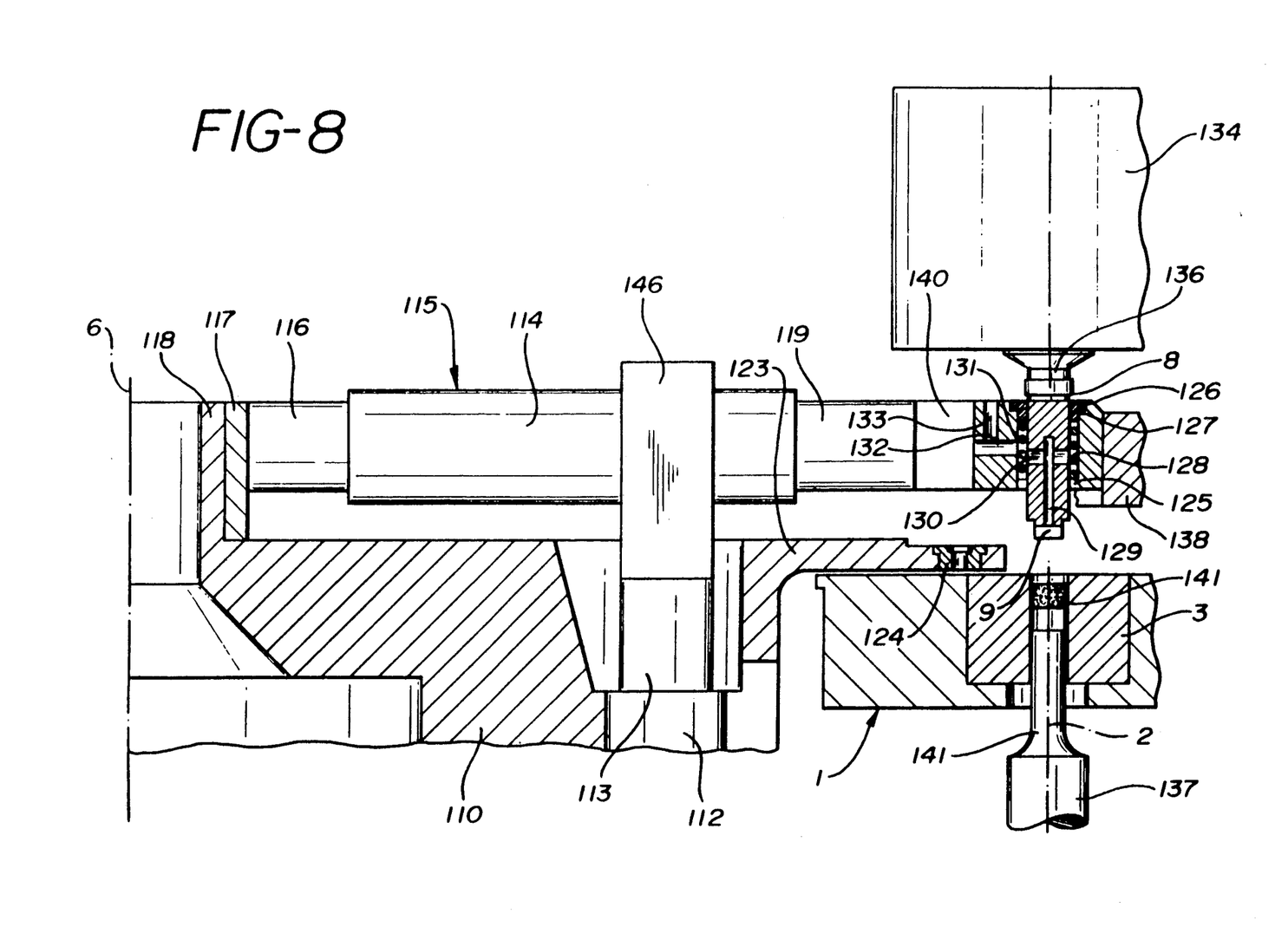
FIG. 8 is an enlarged detail section through the transfer mechanism of the coated-core press of the second embodiment prior to bringing the core into a die of the die table.
Figure 9:
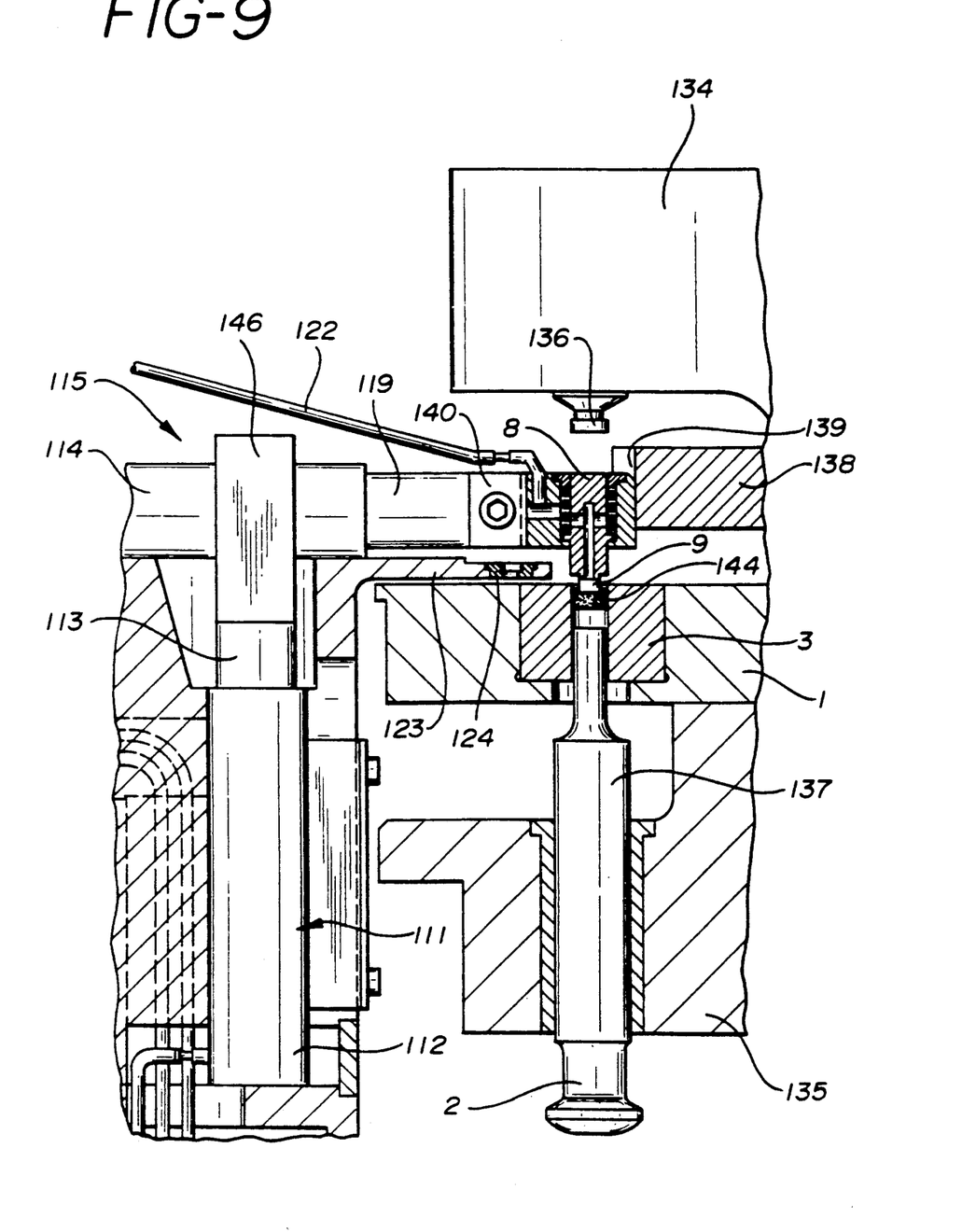
FIG. 9 is an enlarged detail of the transfer mechanism of the coated-core press of the second embodiment when inserting the core into the die.

The mode of operation of the second embodiment of a coated-core press shown in FIGS. 5 to 11 is as follows:

By a guide mechanism not shown in more detail, the cores 9 to be provided with a coating 142 are fed to the receiving pockets 124 of the annular disc 123 of the transfer mechanism 4. As shown in detail in FIG. 7, the radial arms 7 runs downwardly under the action of the vertical cylinder piston unit 111, the transfer head 8 being pressed into the head section 140 under the action of the compression spring 128. The transfer head 8 provided at its lower side with the contour of the core 9 to be gripped takes the core 9 out from the receiving pocket 124 under the action of the vacuum pressure built up over the vacuum tube 129. During the rotation of the rotor 110 of the transfer mechanism 4, the radial arm 7 is now raised by means of the vertical cylinder piston unit 111, the transfer head 8 running out downwardly from the head section 140. Then, the transfer head 8 is moved radially outwardly under the action of the horizontal cylinder piston unit 115, as shown in FIG. 8. The transfer head 8 rotates now on its partial circle 141. As soon as the transfer head 8 arrives at the respective die 3 of the die table 1, the head section 140 of the radial arm 7 arrives in a head-receiving depression 139 of the head-guiding rim 138. Such depression guides the transfer head 8 over the distance between two adjacent dies 3 accurately along the partial circle 2 of the die table 1, until the second point of intersection of the partial circles 2, 141 is reached. During this path under overlap of the partial circles 2, 141, a considerable period of time is saved to lower the transfer head 8 into the die 3, to lay the core 9 down and to re-raise the transfer head 8, whereupon a separation between the head section 140 of the radial arm 7 and the head-guiding rim 138 is effected.

Prior to lowering the transfer head 8 into the die 3, the bottom layer 144 of the powder material for the coating 142 of the table to be pressed has been applied therein on the lower punch 137. Into such bottom layer 144, the core 9 is pressed by means of the transfer head 8, the vertical cylinder piston unit 11 moving downwardly. Then, the transfer head 8 is raised out from the die 3 by lifting the radial arm 7 by means of the vertical cylinder piston unit 111. By such pressing the core 9 into the powder material is prevented that the core 9 will run radially outwardly from its centered position within the die 3 under the action of the centrifugal force of the rapidly rotating die table 1.

Figure 12:
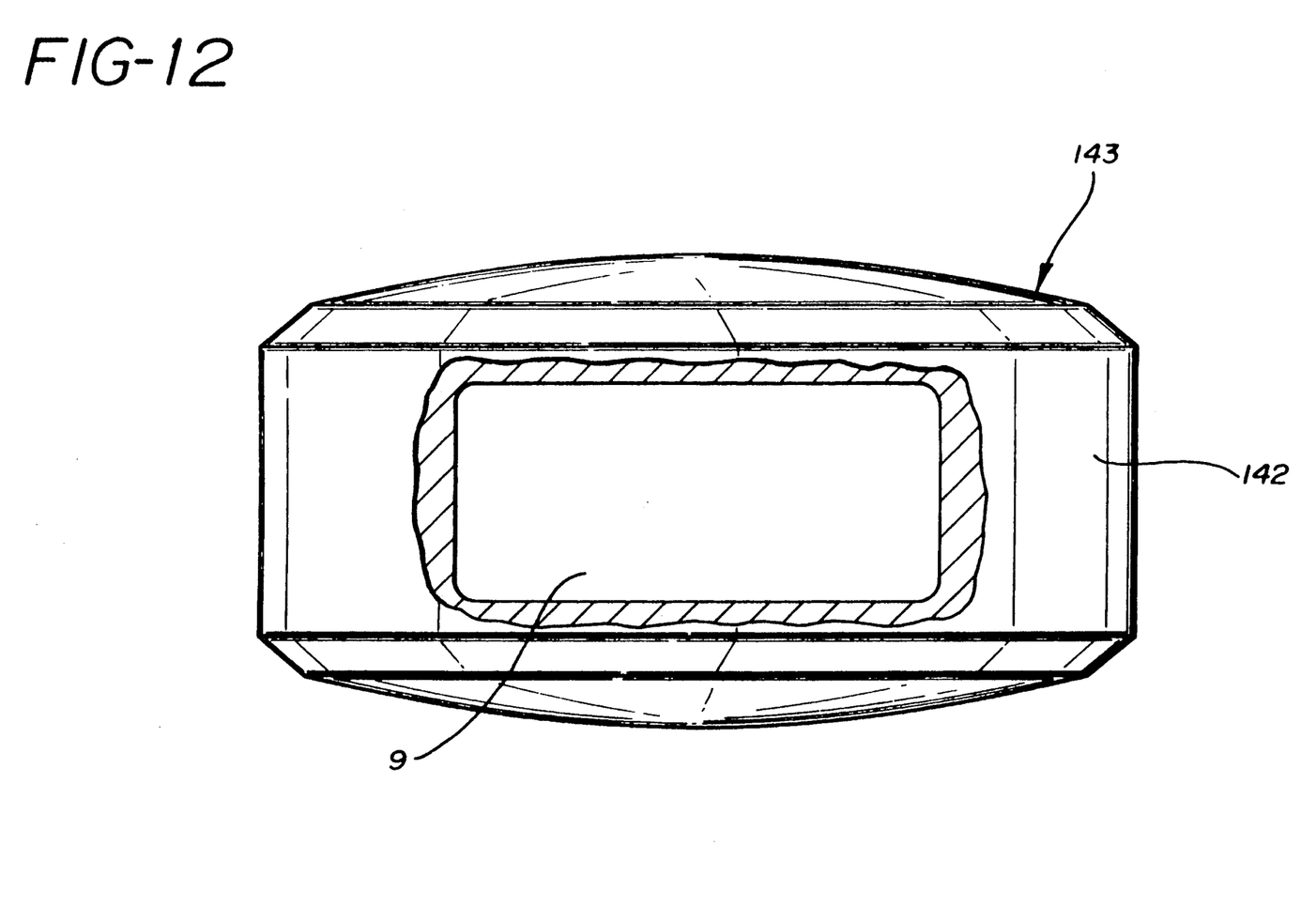
FIG. 12 is an elevational view partially in section of a coated-core tablet.

Finishing of the tablet 143 is then effected by further lowering the lower punch 137 into the die 3, subsequent application of a top layer of powder material into the die 3, and finish-pressing of the table 143 by means of the upper punch 136 running into the die 3. The finished coated-core tablet 143 is shown in FIG. 12.

Figure 11:
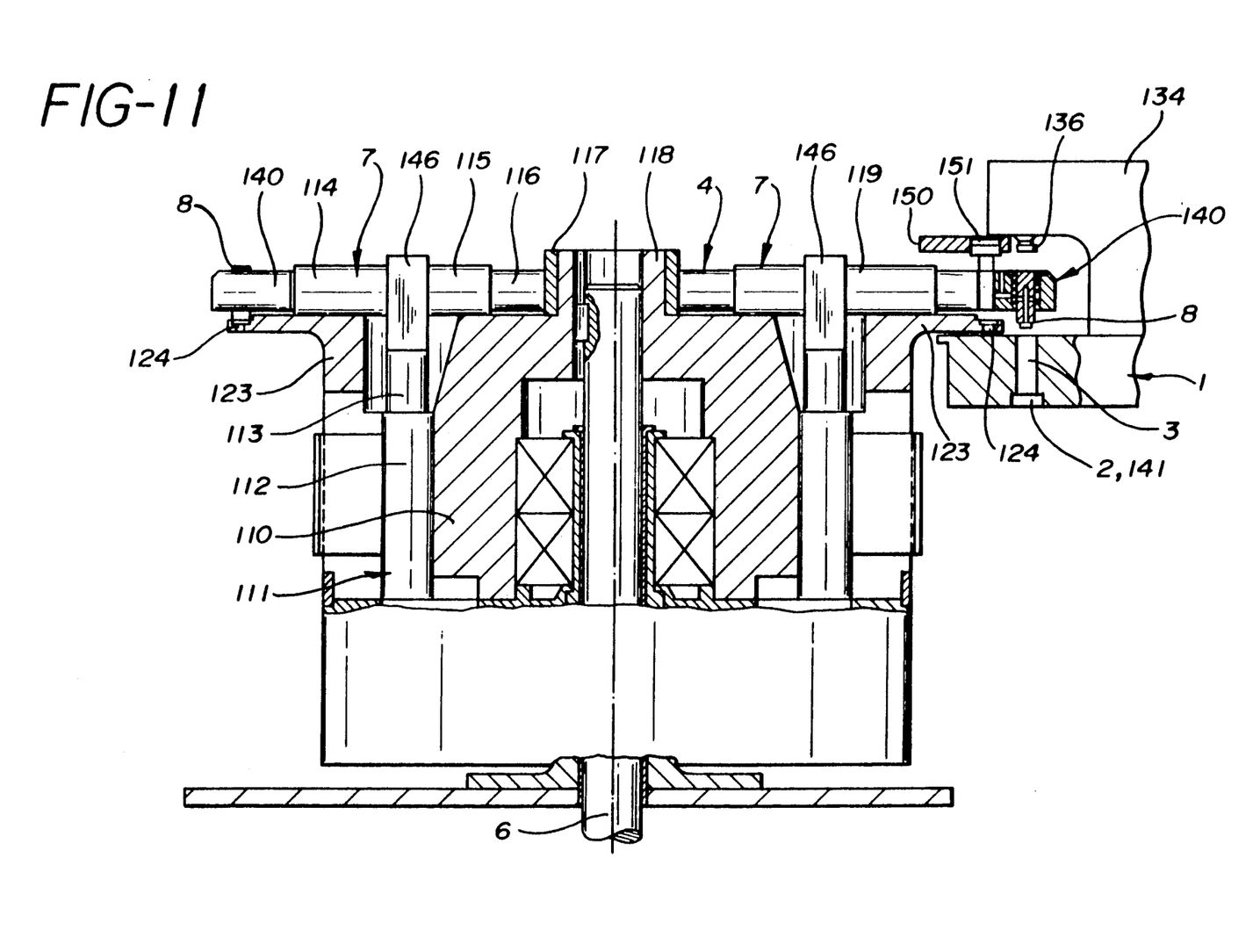
FIG. 11 is a sectional view of a coated-core press of the second embodiment with a slight modification.

In the embodiment shown in FIG. 11, a stationary guide cam curve 150 is assigned to the transfer mechanism 4, such guide cam curve being arranged in the overlap area of the partial circles 2, 141 parallel to the partial circle 2 of the die table 1. For guiding the radial arms 7 at the guide cam 150, rollers 151 are provided at the radial arms 7, such rollers being guided along the guide cam, curve 150.

An important consideration for the accurate operation of the coated-core press of both embodiments are equal rotational speeds of the dies 3 and of the transfer heads 8, and equal distances between the dies 3 and the transfer heads 8 in the overlap area 145 on the connecting chord.

In accordance with the inventive method, the core tablet is formed by positioning a powdered material in a receiving die and thereafter using a punch member to pick up a core material where the core path which brings it over the receiving die and then directing the punch downwardly into the die to force the core into a preselected location in respect to the powdered material.

While a specific embodiment of the invention has been shown and described in detail to illustrate the application of the principles of the invention, it will be understood that the invention may be embodied otherwise without departing from such principles.

We claim:

1. An apparatus for producing a coated tablet from a core and an outer powdered covering which is positioned in a receiving die, the apparatus comprising:

a rotary die table having a plurality of circumferentially spaced receiving dies arranged on a circular die axis;

a core transfer mechanism including a rotor having a plurality of radially extending arms, said rotor being rotatable about a transfer axis parallel to the axis of said die table, said arms having a transfer head with a core punch engageable and movable with the core, said core punch of said arms includes a bore therethrough, said core punches comprising guide pistons guided in said bores, a compression spring loading said core punches into said dies to urge and to position the core in a selected position in respect to the powder therein, said guide pistons are provided with cam pins and including a stationary groove cam disc acting on said pins to guide said pistons with said punches in respect to the die;

a gripping device associated with each of said arms being positionable to move each punch with a core into alignment with the respective die, said die table being movable with said punches to register with said dies, the passive movement of said punches and the axis of said dies being in overlapping relationship.

2. An apparatus according to claim 1 including a support roller guided in a groove cam curve of said groove cam curve disc and including a cam pin with a support roller guided on said cam curve.

3. An apparatus for producing a coated tablet from a core and an outer powdered covering which is positioned in a receiving die, the apparatus comprising:

a rotary die table having a plurality of circumferentially spaced receiving dies arranged on a circular die axis;

a core transfer mechanism including a rotor having a plurality of radially extending arms, said rotor being rotatable about a transfer axis parallel to the axis of said die table, said arms having a transfer head with a core punch engageable and movable with the core, said radial arms comprise guide pistons slidably supported in said rotor, the end of each of said guide pistons terminating in a radial bore of said rotor;

a vacuum mechanism connected to the internal bore of said rotor, said guide pistons are slidably supported within the rotor of said slide bearing bushes, said vacuum mechanism comprises a vacuum disc arranged at said rotor arm and a vacuum chamber formed in a groove cam in said groove cam disc, said vacuum chamber being built up over a part of the periphery of the groove cam disc surface and terminating in an aeration chamber;

a gripping device associated with each of said arms being positionable to move each punch with a core into alignment with the respective die, said die table being movable with said punches to register with said dies, the passive movement of said punches and the axis of said dies being in overlapping relationship;

a lower punch shaft is provided on said core punch which enters into said dies, and including an upper punch shaft loaded by an upper punch of said die table and, both of said punch shafts projecting in a position outwardly of said rotor.

4. An apparatus according to claim 3, wherein the mechanism for receiving the cores includes a feed table with receiving pockets arranged on a partial circle for said cores, each of said feed table being rotatable about an axis parallel to the axis of the rotor of the rotationally driven mechanism, transfer heads in said dies being arranged on partial circles which overlap at least over the spacing of two adjacent dies and that said transfer heads are guided in an overlap area on the partial circle of the receiving pockets.

5. An apparatus for producing a coated tablet from a core and an outer powdered covering which is positioned in a receiving die the apparatus comprising;

a rotary die table having a plurality of circumferentially spaced receiving dies arranged on a circular die axis;

a core transfer mechanism including a rotor having a plurality of radially extending arms, said rotor being rotatable about a transfer axis parallel to the axis of said die table, said arms having a transfer head with a core punch engageable and movable with the core;

a gripping device associated with each of said arms being positionable to move each punch with a core into alignment with the respective die, said die table being movable with said punches to register with said dies, the passive movement of said punches and the axis of said dies being in overlapping relationship;

receiving pockets formed of a hollow outer punch guided in a guide bush and including an inner bush guided centrally within said guide bush.

6. A core encapsulating press for producing encapsulated tablets, comprising:

a rotatably driven die table;

dies supported by said table and arranged on a partial circle;

transfer mechanism means, rotatably driven about an axis substantially parallel to a central axis of said die table, said transfer mechanism means including radially moveable arms with transfer heads arranged at free ends of said radially moveable arms for movement of said transfer heads to register with said dies for transferring cores;

receiving and transferring means for receiving and transferring said cores; said receiving and transferring means, said partial circle of said die table and a region of action of said receiving and transferring means overlapping in a transfer area, said receiving and transferring means including raisable and lowerable core punches including gripping means for seizing said cores in a receiving mechanism and moving said cores in the transfer area into a lower layer of powder material formed within an associated die, said core punches for pressing said cores into the bottom layer of powder material and being loadable by upper punches.

7. A core-encapsulating press according to claim 6, wherein the gripping means comprises vacuum tubes and underpressure means, said vacuum tubes are formed within the core punches and terminate at the lower side of the core punches.

8. A core-encapsulating press according to claim 6 wherein:
said receiving and transferring means guides said core punches into boreholes of the radial arms and guide pistons respectively, and are loaded by compression springs raising a lower side of the core punches above a plane of the die table.

9. A core-encapsulating press according to claim 6 wherein:
guide pistons are provided with cam pins being guided in a stationary grooved cam curve disc.

10. A core-encapsulating press according to claim 9, wherein:
said cam pins are guided with a support roller in a grooved-cam curve of the grooved-cam curve disc.

11. A core-encapsulating press according to claim 6, further comprising:
guide pistons slidably supported in a rotor, the inner ends of such guide pistons terminating in a radial bore of the rotor underpressure means being connected to said bore.

12. A core-encapsulating press according to claim 11, wherein:
said guide pistons are slidably supported within the rotor in slide-bearing bushes.

13. A core-encapsulating press according to claim 6, further comprising:
underpressure means comprising a vacuum disc arranged at the rotor and a vacuum chamber formed in a grooved-cam curve disc, said vacuum chamber being built up over part of a periphery of the grooved-cam curve disc and terminating in an aeration chamber.

14. A core-encapsulating press according to calm 6, wherein:
said core punch comprises a lower punch shaft entering into the dies of the die table and an upper punch shaft loadable by an upper punch of the die table, both punch shafts project from the rotor.

15. A core-encapsulating press according to claim 6 wherein: said receiving and transferring means comprises a feed table with receiving pockets arranged on a partial circle for the cores, said feed table being rotatably driven about an axis substantially parallel to the axis of the rotor of the rotatably driven receiving and transferring means, the partial circles of the feed table and of the transfer heads overlap in the transfer area at least over the distance of two adjacent dies and the transfer heads are guided in an overlap area on the partial circle of the receiving pockets.

16. A core-encapsulating press according to claim 15, wherein:
the receiving pockets are formed of a hollow outer punch guided in a guide bush and of an inner punch guided centrally therein, the inner punch is loadable by a raise cam curve and compression springs are provided between the inner punch and the outer punch.

17. A core-encapsulating press according to claim 6, wherein:
the radial arms are formed of horizontal cylinder piston units receiving at free ends of their piston rods the transfer heads, and cylinders being arranged on the free ends of the piston rods of vertical cylinder piston units, the cylinders are fixedly attached to a rotatable rotor of the receiving and transfer means.

18. A core encapsulating press according to claim 17, wherein:
the piston rods of the horizontal and vertical cylinder piston units respectively, are actuatable independently from each other.

19. A core-encapsulating press according to claim 17, wherein:
the cylinders of the horizontal cylinder piston unit are supported in a sliding manner at a centering piece of the rotor.

20. A core-encapsulating press according to claim 17, further comprising:
guiding means for guiding the transfer heads on the partial circle of the die table; a head-guiding rim rotating therewith and comprising semi-circular head-receiving depressions, said head-receiving depressions being directed by said guiding means coaxially with the dies and into which engage correspondingly semi-circularly shaped head sections of the radial arms in a rotating and sliding manner.

21. A core-encapsulating press according to claim 17, wherein:
said receiving and transferring means has a stationary guide cam curve, said cam curve being arranged in the overlap area of the partial circles and substantially parallel to the partial circle of the die table, and rollers are provided at the radial arms, said rollers being guided along the guide cam curve.

22. A core-encapsulating press according to claim 17, wherein:
the rotor of the receiving and transferring means is provided with an annular disc with receiving pockets for the cores and arranged in a movement area of the transfer heads.

* * * * *

UNITED STATES PATENT AND TRADEMARK OFFICE
CERTIFICATE OF CORRECTION

PATENT NO. : 5,088,915

DATED : February 18, 1992

INVENTOR(S) : Korsch et al

It is certified that error appears in the above-identified patent and that said Letters Patent is hereby corrected as shown below:

Please correct item number 22 on the title page, by changing the PCT Filing Date from:

Jun. 7, 1987 to:

Jun. 7, 1989.

Signed and Sealed this

Ninth Day of November, 1993

BRUCE LEHMAN

Attest:

Attesting Officer        Commissioner of Patents and Trademarks